United States Patent [19]

Biber et al.

[11] 3,930,184
[45] Dec. 30, 1975

[54] ELECTRONIC FLASH COUPLING SYSTEM FOR SEQUENTIAL FLASHBULB FIRING CIRCUIT

[75] Inventors: Conrad H. Biber, Needham; Edwin K. Shenk, Littleton, both of Mass.

[73] Assignee: Polaroid Corporation, Cambridge, Mass.

[22] Filed: Dec. 20, 1973

[21] Appl. No.: 426,967

[52] U.S. Cl............ 315/241 P; 315/157; 315/245
[51] Int. Cl.²..................................... H05B 39/00
[58] Field of Search........ 315/241 P, 149, 151, 157, 315/227, 245; 330/33

[56] References Cited
UNITED STATES PATENTS

| | | | |
|---|---|---|---|
| 2,967,975 | 1/1961 | Hartman | 315/241 |
| 3,033,988 | 5/1962 | Edgerton | 250/205 |
| 3,059,146 | 10/1962 | Bond | 315/245 X |
| 3,710,201 | 1/1973 | Takishima et al. | 95/11.5 |

*Primary Examiner*—Nathan Kaufman
*Attorney, Agent, or Firm*—John W. Ericson

[57] ABSTRACT

An electronic flash system for an automatic camera adapted for use with sequential arrays of flashlamps and having a distributing network for sequentially firing the lamps, one for each exposure. An accessory strobe unit is provided that comprises a photocoupled trigger unit and an impedance network that simulates the impedance seen by the camera during the operation of the flashlamp array.

14 Claims, 11 Drawing Figures

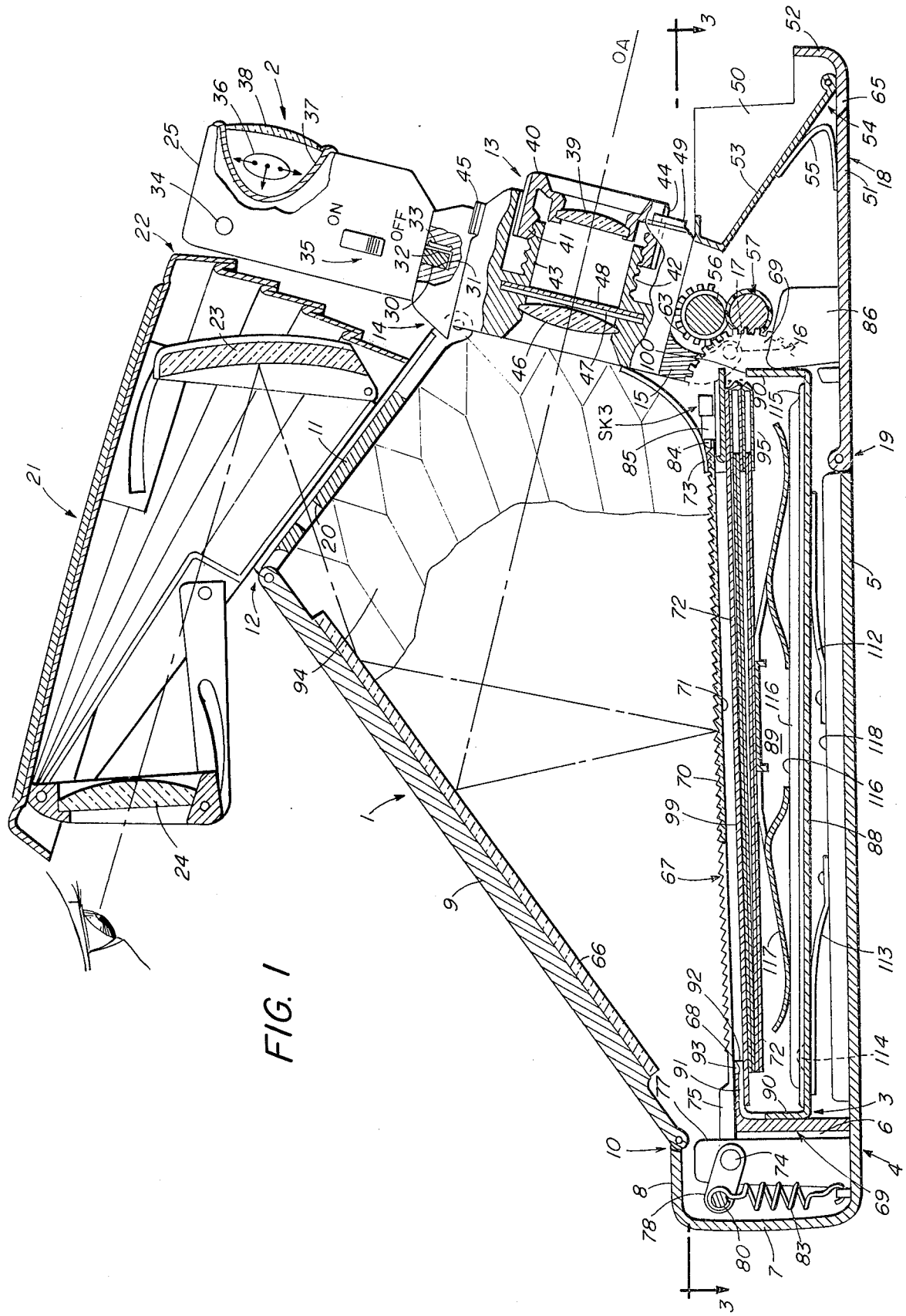

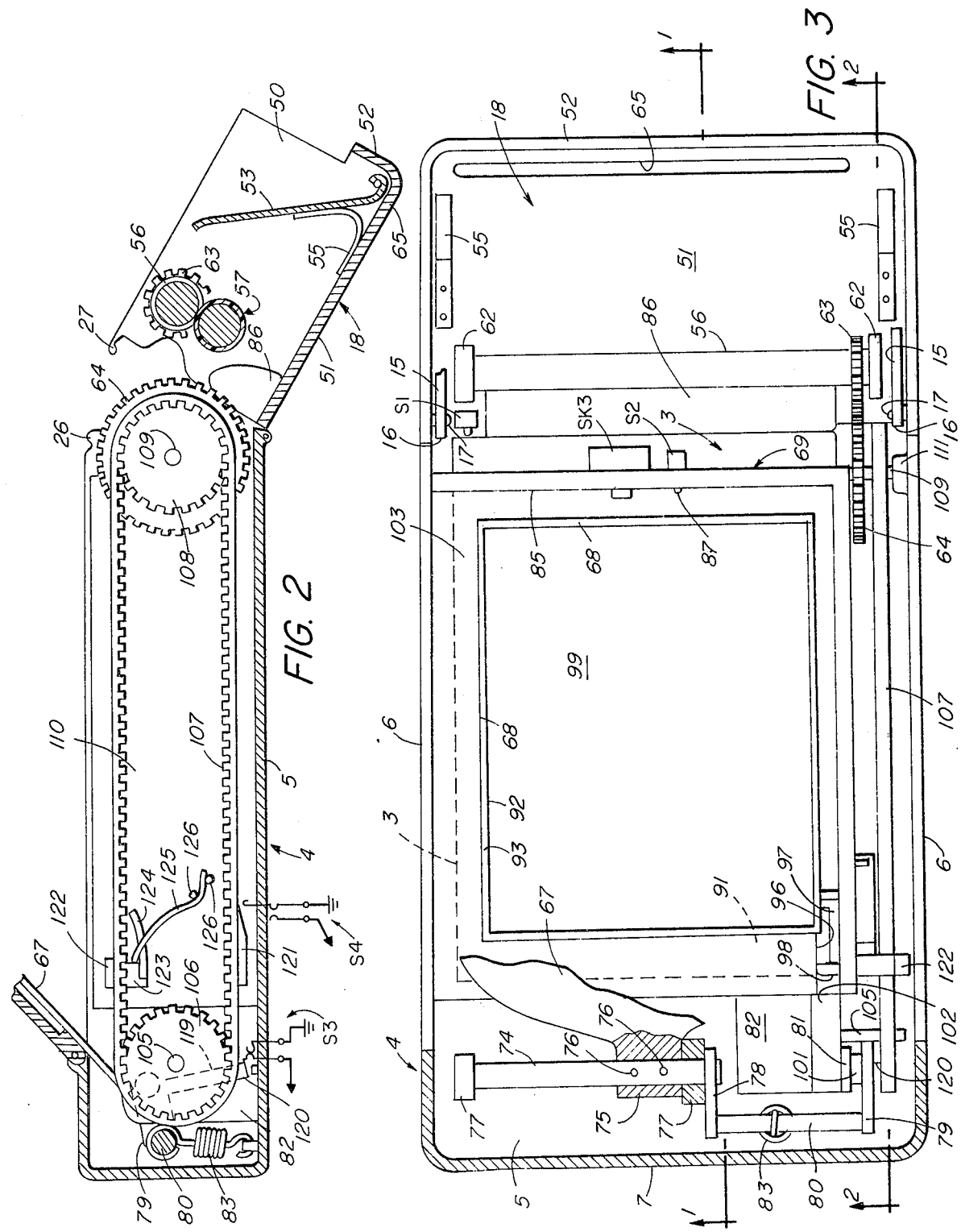

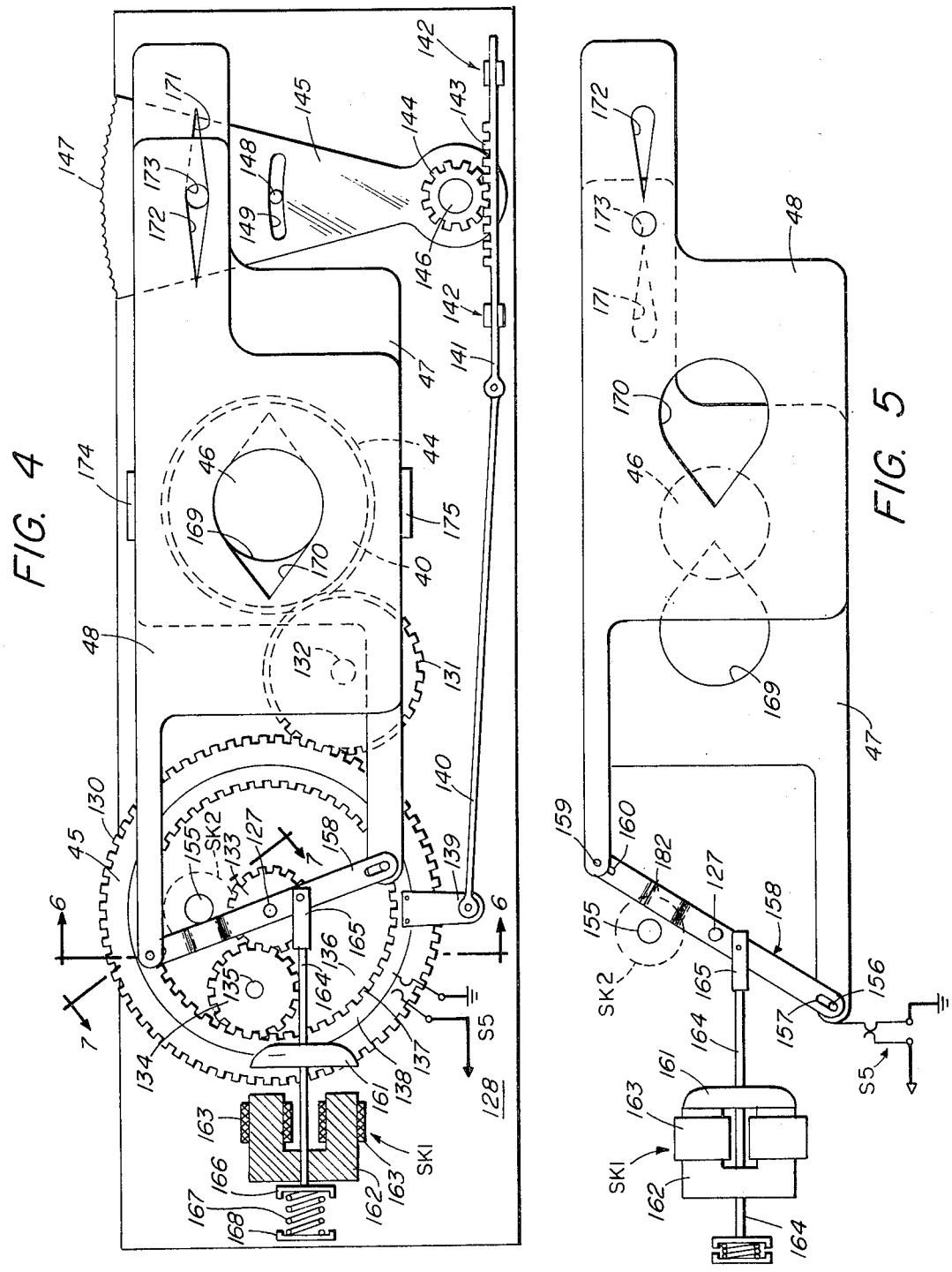

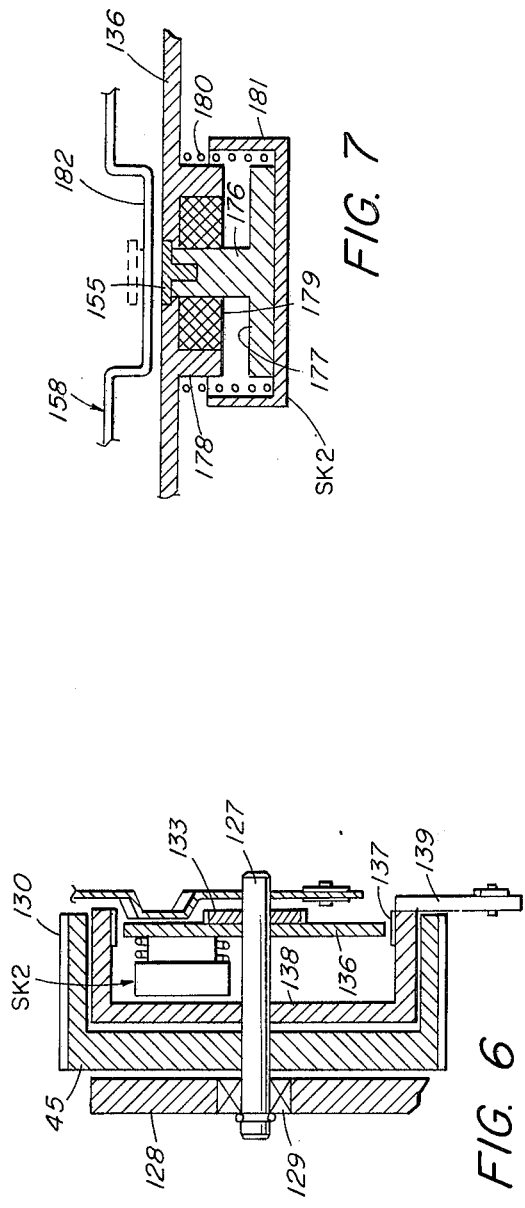

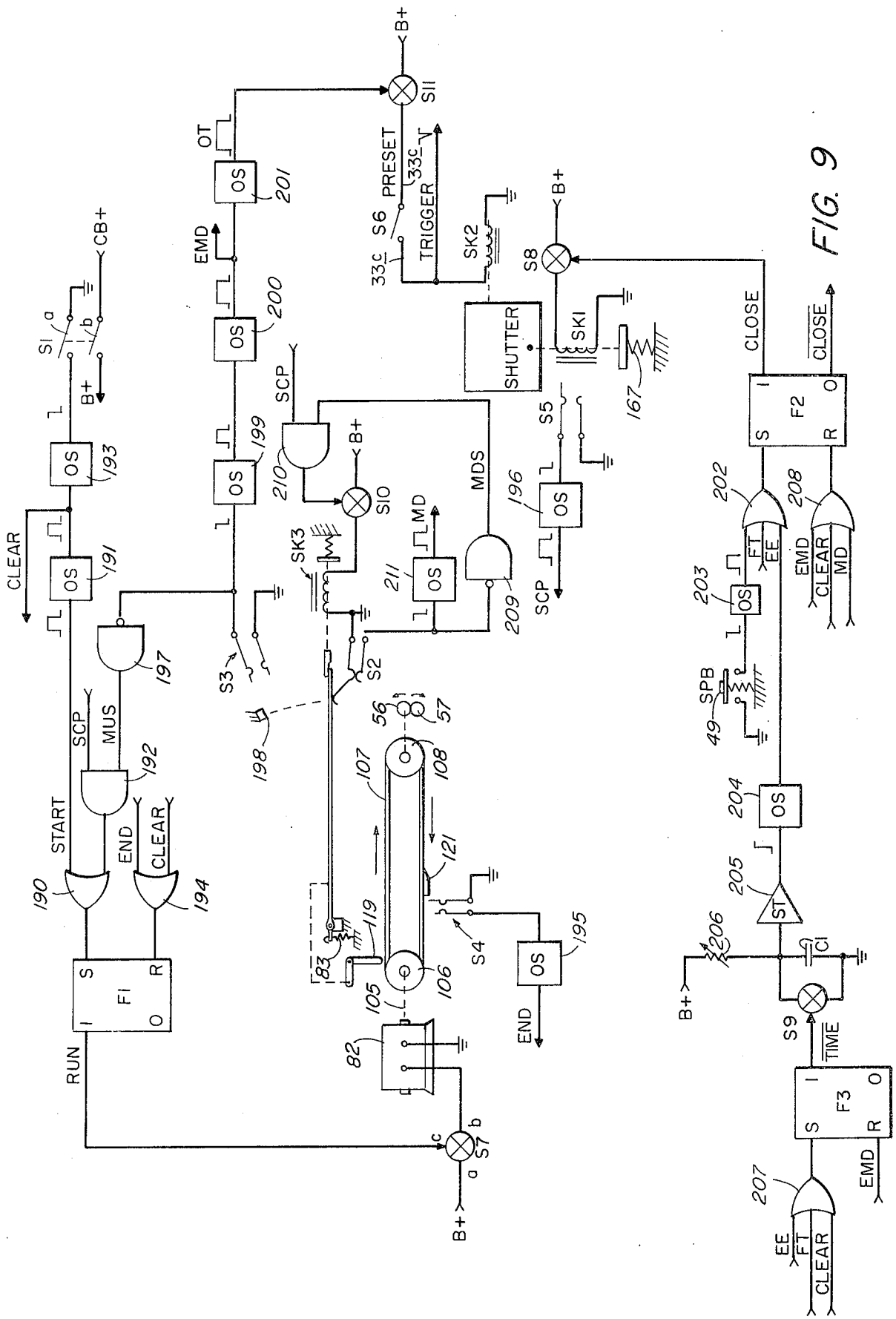

ELECTRONIC FLASH COUPLING SYSTEM FOR SEQUENTIAL FLASHBULB FIRING CIRCUIT

This invention relates to photography, and, particularly to a novel electronic flash system.

The Polaroid SX-70 Land Camera, made and sold by the Polaroid Corporation of Cambridge, Massachusetts, U.S.A., is adapted to make photographs automatically either by ambient light or with the aid of a flashlamp array. For this purpose, the camera is provided with an accessory socket in the shutter and lens board housing which will accept a plug formed a flashlamp array. The flashlamp array includes five flashlamps in one rank, and five in another, so that five sequential exposures can be made, each with a different bulb, when the array is inserted in the socket in either position. The remaining five lamps can be sequentially used by removing the flash array, and putting it back in facing the opposite direction.

The camera is provided with a sequencing circuit which responds to impedance signals from the flashlamp array to select the next unfired bulb for energization, and to sequence the camera circuits which operate the shutter, control the mirror and operate the processing rolls, in dependence on impedance changes which take place as each lamp is fired.

It would be highly desirable to extend the capabilities of the Polaroid SX-70 Land Camera, and other cameras adapted for use with flashlamp arrays, for use with electronic flash. The primary object of this invention is to make it convenient to do so.

There are various problems inherent in the adaptation of a strobe unit to an automatic camera having a sequencing circuit for firing flashlamps. One approach to such an adaptation would be to remove the camera's sequencing circuits and to rewire the camera to accept directly an electronic flash unit of any convenient design. However, that would be an expensive and complex task, and the result, if successful in its purpose, would destroy the camera for use with flashlamps. It is, then, desirable to retain the sequencing circuits and their function. A particular problem in this regard is that the high voltages and rapid current changes inherent in the operation of an electronic flash unit cause field transients; coupling of these transients into the low level logic circuits of the camera might cause false operation or damage to the components. One solution to this problem has been disclosed and claimed in U.S. application for Letters Patent Ser. No. 329,371, filed on Feb. 5, 1973 by Seymour Ellin and Richard C. Kee for ADAPTER APPARATUS FOR FLASH FIRING SYSTEM and assigned to the assignee of this application. In that application, an adapter is disclosed which simulates the impedance of an unfired flashlamp with a fixed resistor, and uses a relay to decouple the camera circuits from the strobe circuits. It is a particular object of the invention to enable an electronic flash unit to be coupled to a flash sequencing array while simulating the impedance of a flashlamp both before and after firing without causing transient coupling into the sequencing circuits when the electronic flash unit is discharged, without the use of electromechanical devices such as relays or the like.

The above and other objects of the invention are attained by a novel electronic flash construction in the form a plug-in strobe unit having a plug fashioned to the dimensions of the plug on a conventional flashlamp array. On the plug are mounted terminals adapted to engage selected ones of the terminals in the socket of a camera that is adapted to receive the plug of a flashlamp array.

Preferably, the strobe unit is provided with its own power supply, in the form of a battery and a trigger converting circuit for producing the high voltages necessary to operate an electronic flash unit. The provision of a separate power supply for the strobe unit reduces the currents required to be exchanged between the flash unit and the camera.

An impedance network in the strobe unit is connected to selected terminals on the plug. Upon receipt of a trigfger signal, the impedance network simulates the behavior of a flashlamp and reflects a corresponding impedance to the camera terminals.

When a conventional flashlamp is fired, there is an initial surge of current as the filament heats up and begins to burn, and the current then drops as the filament burns away while the flash is produced. The impedance network provided in accordance with the invention has corresponding impedance characteristics.

The current produced when the camera supplies a trigger signal to the flash unit of the invention causes a light-emitting diode to produce a light flash that is sensed by a light-responsive diode. The light-responsive diod is connected to a trigger circuit for gating the flash tube into conduction to cause it to discharge and produce a flash. Since there is no electronic coupling, but only optical coupling, between the input terminals and the flash trigger circuit, the possibility of transients being coupled into the sequencing circuit of the camera is greatly reduced.

The apparatus of the invention, and its mode of operation, will best be understood in the light of the following detailed description, together with the accompanying drawings, of an illustrative embodiment thereof.

In the drawings,

FIG. 1 is a schematic elevational sketch, with parts shown in cross-section and parts broken away, of an automatic camera equipped with an electronic flash system in accordance with the invention, taken essentially along the lines 1—1 in FIG. 3 but with additional parts shown;

FIG. 2 is a fragmentary schematic elevational view, with parts shown in cross-section, parts omitted and parts broken away, of the apparatus of FIG. 1, taken substantially along the lines 2—2 of FIG. 3;

FIG. 3 is a fragmentary schematic plan view of the apparatus of FIGS. 1 and 2, taken substantially along the lines 3—3 in FIG. 1, with parts omitted, parts shown in cross-section and parts broken away;

FIG. 4 is a schematic elevational sketch, with parts shown in cross-section, showing the details of exposure control means forming a portion of the apparatus of FIGS. 1 through 3 on an enlarged scale;

FIG. 5 is a schematic elevational sketch of a portion of the apparatus of FIG. 4, showing the parts in another position assumed during their cycle of operation;

FIG. 6 is a schematic cross-sectional view of a portion of the apparatus of FIG. 4, taken substantially along the lines 6—6 in FIG. 4;

FIG. 7 is a schematic fragmentary cross-sectional elevational sketch of a portion of the apparatus of FIGS. 4, 5 and 6, taken substantially along the lines 7—7 in FIG. 4 but on an enlarged scale;

FIG. 8 is a schematic fragmentary elevational sketch similar to FIG. 5, showing the parts of FIG. 5 in another position assumed during their operation;

FIG. 9 is a schematic block and wiring diagram of the exposure control and film processing apparatus forming a part of the camera of FIG. 1;

Figures 10, 11:
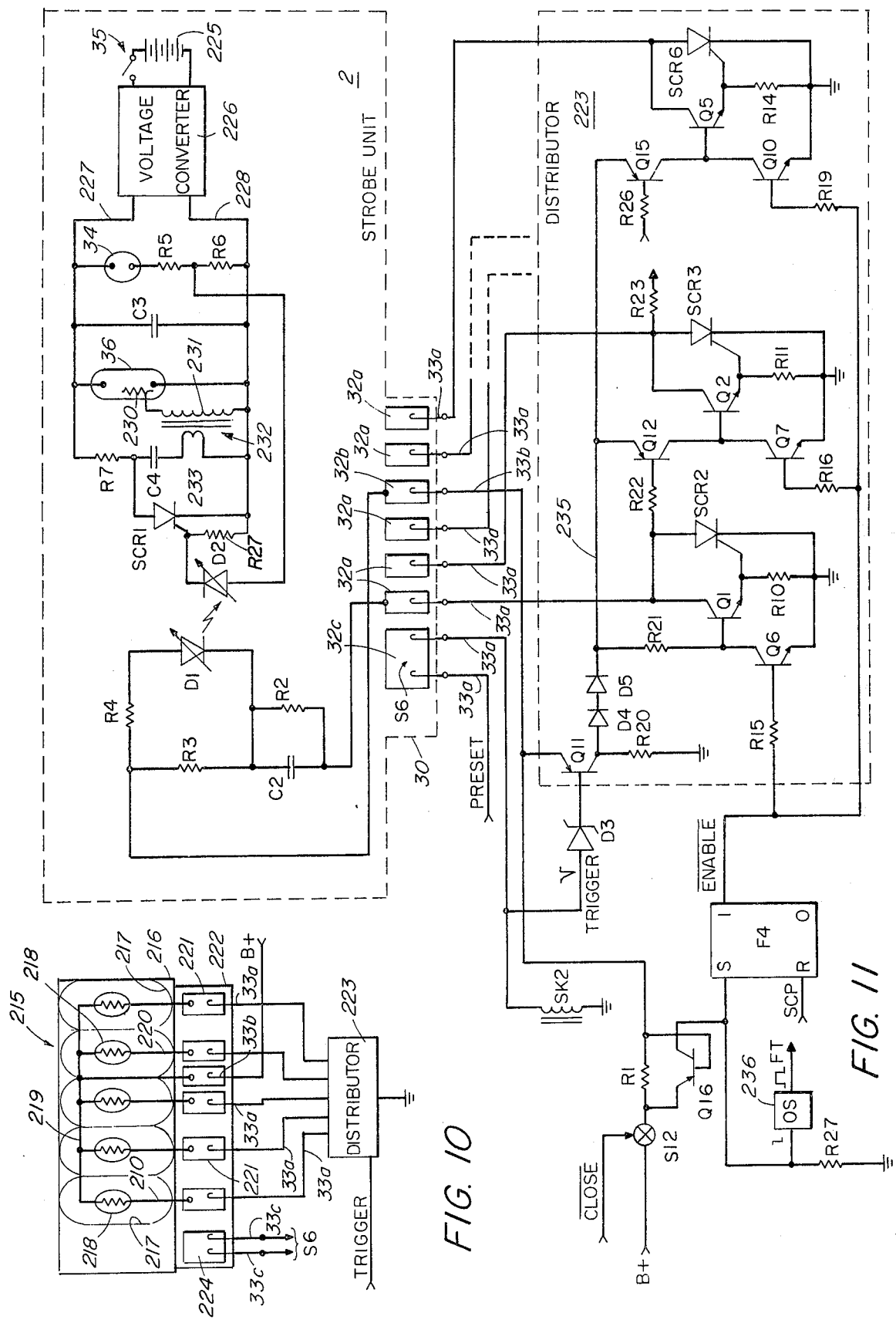
FIG. 10 is a schematic block and wiring diagram of a conventional flashlamp array connected to the apparatus of the camera of FIG. 1.
FIG. 11 is a schematic wiring diagram of a strobe unit connected to a control system forming a part of the camera of FIG. 1.

Referring first to FIG. 1, there is shown an automatic camera generally designated 1 arranged to receive a strobe unit generally designated 2. The strobe unit at times provides light for the exposure of film units in a cassette generally designated 3, received in the housing of the camera in a manner to be described. The camera is shown in the erect position with the strobe unit 2 installed and the cassette 2 in the condition assumed just after it has been inserted in the camera.

In more detail, the camera 1 comprises a body housing 4 comprising a bottom wall 5, side walls such as 6, and an end wall 7. The top wall 8 of the body housing 4 is hinged to a rear cover panel 9 as suggested at 10. The cover panel 9 is hinged to a forward cover panel 11 as suggested at 12.

The panel 11 is hinged to a lens board and shutter housing generally designated 13, as suggested at 14. The lens board and shutter housing 13 is provided with support arms 15 extending down on either side to ears 16 connected to extensions of the side walls 6 by means shown as pivot pins 17. By this arrangement, the panels 9 and 11 and the lens board and shutter housing 13 can be pivoted between the erected position, shown in FIG. 1, and a collapsed position in which the panels 9 and 11 are substantially parallel to and coplanar with the top panel 8.

In the collapsed position, the lens board and shutter housing 13 comes down into a front housing portion 18. The front housing 18 is hinged to the body housing 4 as indicated at 19, for movement between the position shown in FIG. 1 and the position shown in FIG. 2, in which a cassette 3 can be inserted into the housing.

The front housing 18 may be held in the position shown in FIG. 1 by conventional detachable latch means, schematically shown in FIG. 2 as cooperating parts 26 and 27 on the housings 4 and 18, respectively. Similarly, the panels 9 and 11 may be held in the erected position shown by a detachable conventional erecting linkage, not shown, extending between the housing 4 and one of the panels.

The forward upper panel 11 is provided with an aperture indicated at 20 which serves to admit light to a viewfinder assembly generally designated 21. The details of the viewfinder assembly 21 form no part of this invention, but, as schematically indicated, comprise a collapsible housing 22 secured to the top panel 11 and containing a concave viewing mirror 23 for directing image-forming rays from the aperture 20 through an objective lens 24 mounted in the housing 22. The housing 22 may be made collapsible, if desired, as shown and described in more detail, for example, in copending U.S. application for Letters Patent, Ser. No. 308,679, filed on Nov. 22, 1972 by Edwin H. Land for ELECTRONIC PHOTOGRAPHIC SYSTEM and assigned to the assignee of this application.

The strobe unit 2 comprises a housing 25 of any suitable conventional material, such as plastic or the like, which is detachably secured to the upper portion of the lens board and shutter housing 13 by means shown as a plug 30 formed integral with the housing 25 and cooperatively received by a socket 31 formed in the lens board and shutter housing 225. A set electrical such as 32, connected and spaced in mutually insulated relation to the plug 30 on the strobe unit, mate with corresponding spaced insulated terminals, such as generally designated 33, secured to the lens board and shutter housing 25 to exchange electrical signals between the strobe unit 2 and the camera 1 in a manner to be discussed below in detail in connection with FIGS. 10 and 11.

In the housing 25 is formed a window through which a ready light 34, to be described below, is visible. Also mounted on the housing 25 is an ON-OFF switch 35. A strobe tube 36, which may be a grid-controlled gas discharge tube of the conventional variety, is mounted on a reflector 37 secured to the housing 25. A lens 38 over the reflector 37 protects the gas tube 36 from external damage, and cooperates with the reflector to direct light into the solid angle seen by the camera lens.

A taking lens mounted in the lens board and shutter housing 13 comprises an outer movable front element 39 mounted in an adjustable barrel 40. The barrel 40 is threaded, as indicated at 41, to cooperate with corresponding threads 42 formed on a fixed barrel portion 43 of the lens board and shutter housing 13 for rotation about the optical axis of the lens to move the front element back and forth and thereby focus the lens on objects at various distances from the camera.

The adjustable barrel portion 40 is formed with teeth 44 around its outer periphery to cooperate with a gear, not shown in FIG. 1, that connects it to a rotatable manual knob 45, to be described in connection with FIG. 4, to enable the operator to rotate the front element 39 and thereby translate it along the optical axis of the camera and focus the lens.

A rear lens element schematically indicated at 46 is secured in the barrel portion 43. Between the elements 39 and 46 is located a shutter comprising a pair of relatively movable blades schematically indicated at 47 and 48, to be described below in more detail with reference to FIGS. 4, 5, 6, 7 and 8.

A manually operably shutter button 49 is schematically shown as located on the front of the lens board and shutter housing 13, for convenient access by the finger of an operator. The three elements on the camera which require manipulation by the operator are thus the ON-OFF switch 35, which controls charging of the strobe unit 2, the focus knob 45, and the shutter button 49. Other functions required for the exposure and processing of a photograph are carried out automatically, in a manner to appear.

The front housing 18 comprises side walls such as 50, a bottom wall 51 hinged to the main housing floor at 19, and a partial front wall 52. A plate 53, of sheet metal or the like, is hinged to the bottom wall 51 as indicated at 54 and biased upwardly to the position shown in FIG. 1 by springs 55. See also FIG. 3.

In the position shown in FIG. 1, the plate 53, lens board and shutter housing 13, and side walls 50 and bottom wall 51 of the housing 18 define a lightight space about a pair of spreader rolls 56 and 57. The spreader rolls 56 and 57 are journalled in bearings 62 fixed to the bottom plate 51, as suggested in FIG. 3. The rolls 56 and 57 are in frictional engagement so that when one of the rolls is driven, the other follows. For that purpose, a gear 63 fixed to the spreader roll 56, as shown in FIGS. 1 and 3, is arranged to be driven by a gear 64, in a manner to be described below, and thereby drives the roll 57.

The roll 56 may be made of stainless steel and the roll 57 may be made of stainless steel covered with polyurethane. A film unit, introduced into the bite of the rolls in a manner to appear, will be driven by the rolls toward an exit slot 65 formed in the bottom wall 51.

The optical system of the camera 1 is completed by fixed mirror 66, mounted on the lower surface of the upper panel 9, and a movable mirror 67. The mirror 67 is movable between the position shown in FIG. 1, and a rotated position in which it is closely adjacent to and parallel to the mirror 66. In the position shown in FIG. 1, the mirror 67 covers a framing aperture 68 formed as a rectangular opening in a cassette receiving well generally designated 69 formed integrally with the bottom wall 5 of the rear housing 4 and serving to enclose the cassette 3 and other apparatus to be described.

In the position of the mirror 67 shown in FIG. 1, a fresnel mirror surface 70 formed on the upper surface of the mirror 67 forms a part of a viewing and focusing system. In that position, light entering along the optical axis OA of the lens is reflected downwardly from the mirror 66, then reflected upwardly from the fresnel mirror surface 70, is again reflected from the mirror 66 to the concave mirror 23, and thence passes through the objective lens 24 to the observer. The observer then rotates the front barrel 40 of the lens to bring the observed image into focus.

When the mirror 67 is moved into its position parallel to the mirror 66, light entering through the lens is reflected from a mirror surface 71 formed on the lower surface of the mirror 67 down onto the uppermost one of a set of film units such as 72 in the cassette 3. In that position, a flexible flap 73 hinged to the end of the mirror 67 covers the aperture 20 in the front of the panel 11 and prevents light from entering through the viewing system and exposing the film unit.

The mirror 67 is mounted on a shaft 74, as best shown in FIG. 3, by means schematically indicated as comprising an extension 75 formed on the end of the mirror 67 and bored to accept the shaft 74, the shaft 74 being affixed to the mirror 67 by pins indicated at 76. The shaft 74 is journalled for rotation in the rear housing 4 in bearings schematically indicated at 77 secured to the bottom plate 5.

The shaft 74 is fixed to a crank arm 78. The crank arm 78 is connected to another crank arm 79 by an intermediate crank pin 80. The crank arm 79 is fixed to a stub shaft 101 that is journalled for rotation in bearings schematically indicated at 81 fastened to the outer housing of a reduction gearing assembly schematically indicated at 102 and driven by a DC motor 82 at times to be described below.

The crank pin 80 is connected to one end of a tension spring 83 that is secured at its other end to the bottom panel 5, as schematically indicated in FIGS. 1 and 2. The spring 83 urges the mirror 67 upwardly, against a stop, not shown, such that it is close to and parallel with the mirror 66.

When the crank assembly 78, 79 and 80 is driven in a manner to be described, the mirror 67 is brought down to the position shown in FIG. 1, where it is detachably retained by a latch schematically indicated at 84. The latch 84 protrudes through a wall 85 formed integrally with the main housing 4, and is spring biased into the latching position shown. The latch 84 is arranged to be released when a solenoid SK3 energized in a manner to be described.

A support member 86 fixed to the bottom wall 51 of the front housing 18 is adapted to engage and retain a cassette 3 in position on the housing 4 when the front housing 18 is in the position shown in FIG. 1. When the cassette 3 is present in the housing 4, and the housing 18 is closed, a switch S1, schematically indicated in FIG. 3, is closed. At other times, switch S1 is open, and indicates that the housing is open.

When the mirror 67 is moved into the position shown in FIG. 1, a second switch S2 is closed. As indicated in FIG. 3, the switch S2 has an actuating element 87 protruding through the wall 85 and adapted to be engaged by the mirror 67 when it is in the position shown in FIG. 1. In the position of the mirror 67 shown in FIG. 2, the switch S2 is open.

The cassette 3 may be an SX-70 Land film pack, as manufactured and sold for use in the Polaroid SX-70 Land Camera. The cassettes 3 are generally trapezoidal in cross-section, as shown in FIG. 1, and generally rectangular in plan, as suggested in FIG. 3. The cassettes each comprise a housing, of plastic or the like, comprising a bottom wall 88, side walls such as 89, end walls such as 90, and a top wall 91. The top wall 91 is formed with a rectangular recess 92 surrounded by a rim 93 that mates with the framing aperture 68 in the camera and serves to define the limiting aperture through which the uppermost film unit 72 is exposed.

A lighttight seal is formed about the chamber defined by the panels 9 and 11, the lens board and shutter housing 13, and the housing 4, by flexible bellows panels schematically indicated at 94. The panels 94 are connected to the sides of the elements with which they define the lighttight film exposing space.

The film units 72 in the cassette 3 may be of the type shown and described in U.S. Pat. No. 3,415,644, issued on Dec. 10, 1968 to Edwin H. Land for NOVEL PHOTOGRAPHIC PRODUCTS AND PROCESSES, and in U.S. application for Letters Patent Ser. No. 194,407, filed on Nov. 1, 1971 by Edwin H. Land for NOVEL PRODUCTS AND PROCESSES, both assigned to the assignee of this application. Generally, as is more fully disclosed in those references, the film units comprise a number of photosensitive layers in which latent color images can be formed, and other layers which cooperate with the photosensitive layers. A processing composition is contained in a pod 95 at the end of each said film unit. When the film unit is compressed between the spreader rolls 56 and 57, the processing composition in the pod 95 is forced between selected layers of the film unit, thereby initiating the diffusion transfer process which develops and fixes the image.

Referring to FIG. 3, a slot 96 formed in one corner of the top wall 103 of the cassette receiving compartment 69 exposes a slot 97 formed in the top wall 91 of the cassette 3, and is adapted to receive a picker finger 98. The picker finger 98 is actuated at times to be described to move the topmost one of the film units 72, or a dark slide 99 that initially covers the film units as shown in FIGS. 1 and 3, out through a slot 100 in the end wall 90 of the cassette and into the bite of the rolls 56 and 57. As will appear, the function of ejecting the dark slide 99 is performed automatically when the cassette is first inserted in the camera and the housing 18 is closed.

A DC motor 82 is mounted on the base plate 5 in the housing 4, and is connected to drive the reduction gear assembly 102. The motor 82 may be assumed to be a conventional DC motor coupled to a conventional planetary reduction gear train 102. As shown in FIG. 2, the gear train 102 has an output shaft 105 fixed to a gear 106 having teeth meshing with corresponding teeth formed on a flexible timing belt 107 of fiber or fabric reinforced rubber, polyurethane, neoprene or the like, or other suitable flexible but relatively inextensible material.

The timing belt 107 is coupled to a gear 108 fixed on a shaft 109 disposed at the front of the housing 4 and confronting the housing 18. The shaft 109 is journalled in suitable bearings fixed to the wall 110 of the cassette well 69 and to a bearing 111 secured to the wall 6, as indicated in FIG. 3.

On the shaft 109 is a fixed gear 64 which drives the processing rolls 56 and 57 through the gear 63, as described above, when the front housing 18 is in the position shown in FIG. 1.

The cassette 3 is retained in the position shown, and urged upwardly into engagement with the framing aperture 68 in the camera, by a pair of springs, such as the spring 112 shown in FIG. 1, toward one end of the cassette 3, and a resilient pair of spring contact fingers such as 113. The contact fingers 113 are electrically connected to circuit means, to be described, to supply power to the camera and strobe unit when the cassette is in position.

The fingers 113 are formed with contacts such as 114 that extend up through cooperating apertures in the bottom wall 88 of the cassette 3, and thence through corresponding apertures formed in an insulating backing plate 115, of cardboard or the like, into engagement with the terminals of a battery, generally designated 116 and described in more detail in the above-cited copending U.S. application Ser. No. 308,679.

The battery 116 is retained in position against the bottom wall 88 of the cassette 3 by means of a spring schematically shown at 117 that also serves to urge the film units 72 upwardly toward the framing aperture in the camera. Most of the components of the camera control circuits, to be described below, may be made in compact integrated circuit form and disposed in a suitable compartment on the floor of the housing 8, as schematically indicated at 118.

As best shown in FIGS. 2 and 3, the crank arm 79 is formed integrally with an angularly disposed crank arm 119 that extends outwardly to an extension 120. The extension 120 passes beneath the belt 107, in position for engagement with a cam 121 formed integrally with the belt, and also into a position into which it can close the contacts of a switch S3 in the position shown in FIG. 2, for purposes to be described.

When the shaft 105 is turned by the drive shaft 105 in the sense driving the belt 107 clockwise in FIG. 2, the cam 121 engages the extension 120 formed on the crank arm 119, causing the switch S3 to open driving the crank arms 79 and 78 through the intermediate crank pin 80 to turn the shaft 74 and bring the mirror 67 from the position shown in FIG. 2 down into the latched position shown in FIG. 1. As the cam 121 drives the arm 119 clockwise, as seen in FIG. 2, the extension 120 rises radially away from the cam 121 because of the different centers of rotation of the shaft 105 and of the arm 119 about the shaft 101. The cam 121 may be arranged to leave the extension 120 just after the mirror 67 has been brought down into position to be captured by the latch 84 in FIG. 1.

Freed of the load of the arm 119 working against the spring 83, the cam 121 travels into engagement with a slider arm 122. The arm 122 is formed integrally with a downwardly extending arm 123 which is bent to extend through a slot 124 formed in the wall 110, and is bent again to form the picker finger 98 described above. The assembly comprising the arms 122 and 123 and the integral picker finger 98 are urged into the position shown in FIG. 2 by a light spring 125 affixed to one end of the wall 110 by means shown as pins 126.

As the arm 122 is driven to the right in FIG. 2 by the cam 121, it rides up in the slot 124 until it rides over the cam 121. The arm 122 is then returned to the position shown in FIG. 2 by the spring 125. In the meantime, the picker arm 98 has engaged one of the film units, or the dark slide 99, in the cassette 3, and advanced it into engagement with the processing rolls 56 and 57. The rolls are simultaneously driven, through the belt 107 and the gears 108, 64 and 63.

As the belt 107 continues to be driven, the dark slide or film unit will be ejected through the rolls 56 and 57, and thence out through the exit slots 65. Assuming that the ejected element is a film unit 72, the processing fluid within the pod 95 will be distributed through it as it passes through the processing rolls, causing a finished print to be produced shortly after the unit is ejected from the camera.

As the cam 121 approaches the position shown in FIG. 2, it momentarily closes the switch S4. As will appear, closure of the switch S4 will interrupt power to the motor, causing it to coast to a stop with the cam 121 approximately in the position shown in FIG. 2. The exact final position of the cam 121 is not critical.

The details of the exposure control system housed in the lens board and shutter housing 13 will next be described, with reference to FIGS. 4 through 8.

FIGS. 4 and 6 show the focus control elements of the camera of FIG. 1. Specifically, a manually controlled focusing knob 45 is mounted on a shaft 127. As best shown in FIG. 6, the shaft 127 is journalled for rotation in a support plate 128 by means schematically shown as bearings 129. The support plate 128 may be fixed in the lens board and shutter housing 13.

The knob 45 is fixed on the shaft 127 and is provided at its periphery with teeth 130 which serve both to provide a grip for the operator's finger and to mesh with a pinion 131, as shown in FIG. 4, which is rotatably mounted on the plate 128 by means of a shaft 132. The gear 131 meshes with the teeth 44 formed on the barrel 40 of the lens as described above in connection with FIG. 1.

By the construction just described, the lens of the camera is focused when the knob 45 is rotated manually. Provision is also made for establishing the aperture to which the lens will open as a function of the focused distance, for use when electronic flash is employed. For that purpose, referring to FIGS. 4 and 6, a gear 133 is fixed on the shaft 127 to rotate with the knob 45.

The gear 133 drives a planetary gear 134. The gear 134 is rotatably mounted on a shaft 135 that is fixed to a disc 136 which a solenoid generally designated SK2, to be described below, is mounted. The disc 136 is preferably made of a ferromagnetic material.

The planetary gear 134 also meshes with teeth 137 formed on the inner periphery of a cup-shaped member 138 which is rotatably mounted on the shaft 137. An arm 139 affixed to the angular gear 138 is coupled by a link 140 to a rack 141. The rack 141 is slidably mounted in guides 142 that are affixed to the plate 128.

Teeth 143 on the rack 141 mesh with a pinion 144. The pinion 144 is fixed to an adjustable trimming element 145, of transparent material such as plastic or the like, and rotatably mounted on a shaft 146 that is fixed to the plate 128. The trim piece 145 is of generally triangular shape, and is provided with serrations 147 at its upper periphery to facilitate rotation about the axis of the shaft 146 by an operator whose finger engages the serrations 147. Rotation of the trim piece 145 about the shaft 146 is limited by a pin 148 affixed to the plate 128 and extending through an arcuate slot 149 formed in the trim piece 145.

It will be apparent that when the trim piece 145 is rotated clockwise or counterclockwise as seen in FIG. 4, a corresponding rotation of the annular gear 138 will be produced. That will cause rotation of the planetary gear 134, with concomitant movement of the shaft 135, carrying the disc 136 about the shaft 127, because the gear 133 is relatively fixed. On the rotation of the focusing knob 45 with concomitant rotation of the gear 133 will also cause rotation of the gear 134, rotating the shaft 135 about the axis of the shaft 127.

The rotated position of the disc 136, established by the relative positions of the shafts 127 and the link 139, determines the position of an interceptor 155, controlled by the solenoid SK2 in a manner to appear, to determine the maximum aperture to which the shutter is opened in a manner next to be described.

As shown in FIGS. 4, 5 and 8, the shutter comprises a pair of blades 47 and 48. The shuter blade 47 is provided at one end with a pin 156 that is received in an elongated slot 157 formed in one end of a walking beam 158. Similarly, the blade 48 is provided at one end with a pin 159 that is received in a slot 160 formed at the other end of the walking beam 158.

The beam 158 is rotatably mounted on the shaft 127, for free rotation about the axis of the shaft 127 except as constrained by a solenoid SK1, and associated apparatus, next to described. The solenoid SK1 has an armature 161 adapted to be attracted to a core 162 when windings such as 163 on the core 162 are suitably excited in a manner to be described.

An actuator shaft 164 connected to the armature 161 is formed with a clevis 165 at one end that is rotatably pinned to the beam 158. The shaft 164 extends through the armature 161, to which it is affixed, and thence through a suitable bore formed in the core 162 to a stop plate 166 formed integrally with the arm 164.

The arm 164 is urged to the position shown in FIG. 4, in which the walking beam is positioned as shown in FIG. 4, by means of a spring 167 extending between the plate 166 and a fixed support plate 168 secured to the plate 128. By this arrangement, the shutter blades 47 and 48 are driven to the position shown in FIG. 4 by the spring 167 when the solenoid SK1 is deenergized. The blades 47 and 48 moved to the position shown in FIG. 5 when the solenoid SK1 is energized.

The shutter blades 47 and 48 may be stopped in an intermediate position, as shown in FIG. 8, if the interceptor pin 155 is in the path of the walking beam 158 as it moves from the position shown in FIG. 5 to the position shown in FIG. 4. One such typical interrupted position is shown in FIG. 8.

In the position of the shutter blades shown in FIG. 4, a tear-shaped aperture 169 in the blade 47, and a corresponding oppositely directed tear-shaped aperture 170 in the blade 48, expose the lens elements such as 46 at full aperture. In this position of the blades 47 and 48, a second generally tear-shaped aperture 171 in the blade 47, and a corresponding oppositely directed tear-shaped aperture 172 in the blade 48, expose an aperture 173 in any suitable mask, not shown, behind which a photocell, to be described, is located.

The aperture 173 is exposed through the overlying portion of the trim member 145, which may be provided with a circumferentially graduated neutral density scale so that as the trim piece 145 is rotated clockwise or counterclockwise as shown in FIG. 4, more or less light is admitted through the aperture 173 at any given position of the blades 47 and 48. The purpose of this control is to enable the photographer to trim the operation of the automatic exposure apparatus, to be described, so that longer or shorter exposure may be selected to take care of particular scene conditions. The same trimming movement causes the trimming movment of the annular gear 138, to adjust the rotate position of the interceptor pin 155 for purposes to appear.

In the position of the parts shown in FIG. 5, with the solenoid SK1 energized, the lens openings are closed because the apertures 169 and 170 in the shutter blades 47 and 48 are out of registry. The photocell aperture 173 is likewise closed at this time. As the shutter blades 47 and 48 are positioned relative to each other by the walking beam 158, under the control of the solenoid SK1 and the spring 157, they are guided for parallel movement by guide means suggested at 174 and 175, fixed to the plate 128.

Comparing FIGS. 4 and 5, a normally open switch S5 is closed by the end of the blade 47 in the closed position of the shutter shown in FIG. 5. Closure of the switch S5 produces a signal used to control the apparatus in a manner to be described below.

The interceptor pin 155 is controlled by the solenoid SK2 in the manner shown in FIG. 7. In particular, the interceptor pin is formed as a cap screw threaded into engagement with the output shaft 176 of the solenoid SK2. The shaft 176 is of ferromagnetic material, made integral with an armature 177.

The disc 136, of ferromagnetic material, is formed integral with an annular core member 178 which cooperates with the armature 177 when windings 179 are energized to attract the armature 177 to the core piece 178 against the influence of a light spring 180 which extends between the disc 136 and a nonferromagnetic cap 181 secured to the armature 177. When the windings 179 are energized, the interceptor pin 155 is moved upwardly in FIG. 7 to the position shown in dotted lines, where it can intercept a bight 182 formed on the walking beam 158 and prevent further movement of the walking beam.

As shown in FIG. 5, in the closed position of the shutter, the walking beam 158 is displaced from the pin 155, which it will approach by counterclockwise rotation about the shaft 127 when the solenoid SK1 is released. The pin 155 will intercept the walking beam 158 at an adjusted position of the shutter blades that depends on the adjusted position of the disc 136 carrying the interceptor pin 155 and the solenoid SK2. The major adjustment of this position is made with the focusing knob 45; a trim adjustment can be made with the trim piece 145 as described above.

As will appear, in the flash or strobe mode of operation of the camera, the solenoid SK2 is energized when the solenoid SK1 is deenergized, so that the interceptor 155 will move into the path of the walking beam 158 before the spring 167 has a chance to move the beam 158 past the pin 155. If the solenoid SK2 is not energized, as for ambient light exposure, the bight 182 in the beam 158 will simply pass over the pin 155 without interference.

The control circuits for the camera and strobe unit of FIGS. 1 through 8 will next be described with reference first to FIG. 9. For simplicity, the motor 82 is shown schematically in FIG. 9 as being directly connected to the output shaft 105 that drives the gear 106. The gear 106 drives the timing belt 107 carrying the cam 121, as described above.

The motor 82 is operated when a conventional electronic switch S7 is closed and a supply potential at B+ is present to cause flow of operating current through the load terminals a and b of the switch S7 and through the winding of the motor 82 to ground. The switch S7, and other electronic switches to be described, may be any conventional electronic switches having load terminals a and b between which a low impedance appears when a positive signal current is supplied to a control terminal c with respect to ground.

The switch S7 is closed to cause the motor 82 to run when a flip flop F1, of any conventional design, is set to produce a signal labeled RUN that is positive with respect to ground. The convention followed here, as elsewhere in the drawings to be described, is that the label indicates the logical condition present when the labeled lead is positive with respect to ground. Absence of the labeled condition causes a ground potential to appear on the labeled lead.

The flip flop F1 is arranged to be set when a logic 1 signal appears at the output terminal of a conventional OR gate 190. The gate 190 produces a logic 1 output signal, and applies it to the set input terminal S of the flip flop F1, in response to either a START pulse, produced at times by a conventional one-shot multivibrator 191 in a manner to be described, or to a logic 1 signal appearing at the output terminal of a conventional AND gate 192.

The multivibrator 191 produces a positive pulse at the trailing edge of a CLEAR pulse produced at times by a conventional one-shot multivibrator 193. The CLEAR pulse is produced by the one-shot multivibrator 193 at the rising transition produced when the front housing 18 in FIG. 3 is closed and the cassette 3 is in the receptacle 69 to cause the switch S1 to be closed.

Referring again to FIG. 9, the switch S1 may be provided with two armatures a and b. The armature a is connected to ground, and when the switch S1 is closed, a falling transition is produced that triggers the one-shot multivibrator 193. At the same time, or slightly ahead of that time, the armature b of the switch S1 is closed to apply the battery potential CB+, from the battery 116 in the cassette 3 as shown in FIG. 1, to other circuits of the camera, as a supply potential labeled B+.

The CLEAR pulse is applied to one input terminal of a two input terminal OR gate 194. The gate 194 has an active output terminal connected to the reset input terminal R of the flip flop F1. Accordingly, the flip flop F1 is reset when the CLEAR pulse is produced, and, after the CLEAR pulse, is set by the START pulse produced by the multivibrator 191 and supplied through the gate 190.

A second input terminal of the OR gate 194 receives a signal END, produced as a positive pulse by a conventional one-shot multivibrator 195 when the switch S4 is momentarily closed by the cam 121 on the belt 107 as the cam moves toward the end of an operating cycle in a manner to be described. When the END pulse is produced, the flip flop F1 is reset to remove the RUN signal, and thereby stop the motor 82.

A first input terminal of the AND gate 192 receives a pulse labeled SCP, produced as a positive pulse by a conventional one-shot multivibrator 196 at a transition to ground produced by the switch S5 when the shutter is closed, as described above in connection with FIGS. 4 and 5. The second input signal applied to the AND gate 192 is a positive level labeled MUS. The signal MUS is produced at the output terminal of a conventional NOR gate 197 when the switch S3 is closed as the mirror 67 is released and moves to its upper, or film exposing, position. As the switch S3 is closed by the mirror 67, a stop 198, which may be assumed to be secured to the top panel 9 in FIG. 1, is engaged and holds the mirror against the force of the spring 83, shown schematically in FIG. 9.

The falling transition produced by the switch S3 when first closed triggers a conventional one-shot multivibrator 199 to produce an output pulse that has a duration sufficient to persist beyond the time when the mirror 67 may be vibrating or bouncing at the end of the travel to the stop 198. At the trailing edge of the pulse produced by the one-shot multivibrator 199, a conventional one-shot multivibrator 200 is triggered to produce a positive pulse labeled EMD.

At the leading edge of the pulse EMD, a conventional one-shot multivibrator 201 is triggered to produce a timed pulse labeled OT. The duration of the pulse OT is selected to be sufficient to allow operator of the solenoid SK2, to move the interceptor pin 155 in FIGS. 4, 5 and 7 into position to intercept the walking beam 158 and hold it in that position, until the blades 47 and 48 have had time to move in the FIG. 4 position in which the lens is open to its maximum aperture. That operation will be described in somewhat more detail below.

When the pulse OT is produced, a conventional electronic switch S11 is closed to supply operating potential at B+, over contacts schematically indicated as a switch S6, and through the winding of the solenoid SK2 to ground. The signal labeled PRESET between the switches S11 and S6 in FIG. 9 appears on a correspondingly labeled terminal also shown in FIG. 11, for purposes to be described below. The closure of the switch S6 essentially represents that a flashbar containing flashlamps, or a strobe unit, to be described, is connected to the camera and ready for operation.

When the switch S11 is opened after it has been closed, so that the solenoid SK2 is deenergized, a rapid negative voltage spike is produced across the winding of the solenoid SK2, labeled TRIGGER. The TRIGGER signal is used either to fire a flashlamp or to trigger the strobe unit, in a manner to be described below.

As described above, the shutter blades 47 and 48 are normally in the open position, and held there under the influence of the spring 167. The solenoid SK1 is energized to close the shutter when a conventional electronic switch S8 is closed by a positive level labeled CLOSE produced when a flip flop F2 is set in a manner to be described. When the flip flop F2 is set, the signal CLOSE closes the switch S8 to admit current from the supply terminal at B+ through the winding of the solenoid SK1 to ground.

The flip flop F2 is arranged to be set when a logic 1 signal is produced at the active output terminal of a conventional OR gate 202. The gate 202 produces a logic 1 output signal to set the flip flop F2 in response to either a pulse from a conventional one-shot multivibrator 203, to a pulse produced by another conventional one-shot multivibrator 204, or to a signal labeled FT produced at times by the strobe and flash sequencing circuit, to be described below.

The one-shot multivibrator 203 triggered by the transition toward ground produced when a pushbutton SPB is momentarily depressed. The pushbutton SPB has an actuating button comprising the shutter button 49 described above.

The multivibrator 204 produces an output pulse labeled EE in response to the rising transition produced when a conventional Schmitt trigger circuit 205 receives an input voltage above a predetermined value. The Schmitt trigger 205 is controlled by a photocell that is arranged to sense the light passing through the aperture 173 described above in connection with FIGS. 4 and 5.

Turning to FIG. 9, the photocell comprises a photoconductive element 206 that has a high impedance when not illuminated, and a lower impedance when illuminated, determined by the brightness of the illumination. The photoconductor 206 is connected between the supply terminal at B+ and active input terminal of the Schmitt trigger circuit 205.

The active input terminal of the Schmitt trigger 205 is connected to ground through a storage capacitor C1. A conventional electronic switch S9 has load terminals connected in parallel with the capacitor C1, to shunt the capacitor C1 when the switch S9 is closed.

The switch S9 is closed when logic 1 signal labeled $\overline{\text{TIME}}$ is applied to its control terminal. The signal $\overline{\text{TIME}}$ is present at logic 1 when a flip flop F3 is set.

The flip flop F3 is set when an OR gate 207 produces a logic 1 output signal and applies it to the set terminal S of the flip flop F3. The gate 207 has three input terminals, each receiving a different one of the signals labeled EE, FT and CLEAR. Accordingly, the flip flop F3 is set at any time that any of these signals is present at logic 1. The flip flop F3 is reset by the signal EMD corresponding to the output pulse produced by the one-shot multivibrator 200.

The flip flop F2 is arranged to be reset by an OR gate 208 in response to any of the signals EMD, CLEAR or MD. The manner in which the EMD and CLEAR pulses are produced has been described above. The signal MD is produced as a positive pulse by a conventional one-shot multivibrator 208 in response to the ground going transition produced when the switch S2 closed as the mirror. 67 is moved down into the latched position.

When the mirror 67 is moved down and the switch S2 is closed, a conventional NOR gate 209 produces a logic 1 signal labeled MDS that is applied to one input terminal of a conventional AND gate 210. The second terminal of the gate 210 receives the "shutter closed" pulse SCP produced by the multivibrator 196 as discussed above.

When the pulse SCP is produced and the signal MDS is present, the gate 210 produces a logic 1 output signal that closes a conventional electronic switch S10 to energize the solenoid SK3. The solenoid SK3 then retracts the latch 84 and allows the mirror 67 to spring up under the influence of the spring 83 into the picture-taking position described above.

The flash and strobe control circuits used in conjunction with the control circuits of FIG. 9 will next be described with reference to FIGS. 10 and 11. FIG. 10 schematically shows the apparatus provided in the camera for cooperating with a conventional multiple flashbulb array.

As schematically indicated in FIG. 10, a conventional flash array 215 may comprise an insulating block 216 formed on each side with five reflectors 217 comprising reflective recesses in which each of a series of five flashbulbs 218 may be mounted.

Five additional flashlamps may be similarly disposed on the opposite side of the block 216. Each of the flashlamps 218 has one terminal connected to a common terminal 219. Each of the flashlamps 218 has a second terminal 220 connected to a different one of a set of five output terminals 221 formed as conductive strips on a plug member 222 of insulated material that is adapted to fit into the socket 31 in FIG. 1.

The terminals 221 are connected over five supply terminals 33a, comprising specific mutually insulated ones of the terminals generally designated 33 in FIG. 1, to a distributor schematically indicated at 223. Briefly, in response to the TRIGGER pulse supplied to the distributor 223, the distributor connects one of the leads 33a selected in a predetermined sequence to a ground terminal.

The supply terminal at B+ with respect to ground is connected over one of the terminals 33b to the common terminal 219, so that when one of the terminals 33a is grounded through the distributor 223, current flows through the associated flashbulb 218. In a manner to be described below, the distributor selectively grounds the lead 33a connected to the first unfired bulb 218 in an ordered sequence in the array.

The plug 222 is provided with a relatively wide terminal 224 that bridges a pair of terminals 33c in the camera to produce a switching signal labeled S6 in FIG. 10, that signals to the camera circuits that the flash array is in position on the camera and is to be used. It will be apparent that this condition corresponds to the closed switch S6 in FIG. 9. A similar signal is provided by the strobe unit 2, next to be described in more detail in connection with FIG. 11.

FIG. 11 shows the details of a strobe unit 2 adapted to cooperate with the camera of FIG. 1, and further shows a particular form of distributor network adapted to cooperate with the circuits of FIG. 9. Specifically, the strobe unit 2 is provided with a plug 30 on which there is a wide terminal 32c, corresponding to the terminal 224 in FIG. 10. Five terminals 32a are provided corresponding to the terminals 221 in FIG. 10, and one terminal 32b is provided corresponding to the terminal connected to the terminal 33b in FIG. 10. As will appear, only one terminal 32a is electrically necessary, and the other may be omitted if desired.

The terminal 32c is adapted to be bridged by the terminals 33c in the camera to form the closed switch S6 described above in connection with FIG. 9. Comparing FIG. 9 with FIG. 11, the lead label PRESET in FIG. 9 is connected to one of the terminals 33c, and adapted to be connected over the terminal 32c to the other terminal 33c when the strobe unit is inserted into the camera.

One of the terminals 32a, here shown as the one adjacent the terminal 32c, is connected to the terminal 32b by means of an impedance network, next to be described. This network simulates the behavior of a fired flashbulb when ignited, as will appear.

The supply terminal at B+, energized at a positive potential with respect to ground when the switch S1 in FIG. 9 is closed as described above, is connected to the terminal 32b of the camera over the load terminals of a conventional electronic switch S12 and through a resistor R1 to the terminal 33b. When the switch S12 is closed, by the application of a signal labeled $\overline{CLOSE}$ to its control terminal, a positive potential is present at the terminal 33b. The signal $\overline{CLOSE}$ is produced at the logic o output terminal of the flip flop F2 in FIG. 9 when the flip flop F2 is reset. When the strobe unit 2 is connected, the terminal 33b is connected to the terminal 32b on the plug 30.

The network between the terminal 32b and the selected terminal 32a comprises a first path extending from the terminal 32b through a resistor R3 in a series with a capacitor C2 to the terminal 32a. The resistor R3 may have a value, such as four ohms, approximating the resistance of a flashlamp before it is fired.

Connected in parallel with the resistor R3 is a current-limiting resistor R4 and a light-emitting diode D1. The resistor R4 may be, for example, 22 ohms, or any other value suitable for protecting the light-emitting diode D1 while still admitting sufficient current to it to cause it to produce a light signal effective to break down a light-responsive diode D2 in an adjacent trigger circuit, to be described.

A resistor R2 is connected in parallel with the capacitor C2. The resistor R2 has a relatively high value, such as 33,000 ohms, selected to simulate a high and effectively open-circuit impedance between the terminals 32b and 32a, but to be adequate to discharge the capacitor C2 between flashes.

The strobe unit 2 further comprises a battery 225 of any conventional design, connected over the ON-OFF switch 35 described above to a conventional voltage converter 226. The voltage converter 226 operates in a conventional manner to convert the voltage of the battery 225, such as 6 volts, to a suitable strobe operating voltage such as 350 volts. This voltage appears on a pair of output terminals 227 and 228.

A first circuit path across the terminals 227 and 228 includes in series the ready light 34, and a pair of resistors R5 and R6 in series. The ready lamp 34 may be a conventional gas discharge lamp of any suitable design. The sum of the resistors R5 and R6 is selected to limit the current flowing through the lamp 34 to a suitable value. The ratio of the resistances of the resistors R5 and R6 is selected to produce a suitable voltage between the lead 228 and the junction of the resistors R5 and R6 to provide gate current to a silicon controlled rectifier SCC1 when the light-sensitive diode D2 is excited by light from the light-emitting diode D1.

A second path across the leads 227 and 228 comprises a storage capacitor C3 in a suitable size for storing the energy necessary to fire the gas tube 36. The gas tube 36 has electrodes connected across the leads 227 and 228 in the third path. The tube 36 is triggered to produce a flash of light when the capacitor C3 is charged sufficiently to allow the lamp 34 to glow, and a relative high voltage spike, such as 5,000 volts, is applied to the grid terminal 230 of the tube 36.

The grid 230 is connected to the lead 228 through the high voltage secondary winding 231 of a pulse transformer generally designated 232. The low voltage primary winding 233 of the transformer 232 has one terminal connected to the lead 228, and a second terminal connected through a capacitor C4, in a series with a resistor R7, to the lead 227. The silicon controlled rectifier SCC1 has its anode connected to the junction of the resistor R7 and the capacitor C4, and its cathode connected to the lead 228. A resistor R27 is connected between the gate and the cathode of the controlled rectifier SCR1 to prevent false triggering of the controlled rectifier.

During operation of the strobe unit 2, when the switch 35 is closed, the capacitors C3 and C4 will be charged. When the charge is adequate to develop a suitable flash of light for exposure, the ready lamp 34 will discharge and glow, indicating that the strobe unit is ready for use. Thereafter, when a light flash is applied to the diode D2 by the diode D1, the silicon controlled rectifier SCC1 will be gated into conduction, causing discharge of the capacitor C4 through the primary winding 233 of the transformer 232, resulting in a triggering spike being applied to the grid 230 of the tube 36 to cause it to discharge and produce a flash.

Discharge of the capacitor C3 through the tube 36 will cause the ready light 34 to be extinguished, removing the current from the gate of the silicon controlled rectifier SCR1. With the discharge of the capacitor C4, ringing in the discharge circuit will cause a momentary reversal of voltage sufficient to cut off the silicon controlled rectifier SCR1.

The distributor 223 comprises five electronic switches, here shown as an ordered array of silicon controlled rectifiers SCR2 through SCR6. Of these, only the first silicon controlled rectifier SCR2 in the sequence, the second SCR3, and the last SCR6, are shown. The stage comprising the switch SCR3 is typical for the stages comprising the rectifiers SCR4 and SCR5, not shown.

Each of the silicon controlled rectifiers SCR2 through SCR6 has its anode connected to a different one of the terminals 33a, and its cathode connected to ground. Each of the gates of the controlled rectifiers SCR2 through SCR6 is connected to ground through a different one of a set of resistors R10 through R14, of which only the resistors R10, R11 and R14 are shown.

Each of the controlled rectifiers SCR2 through SCR6 has its anode connected to the collector of a different one of a set of five NPN transistors Q1 through Q5. The emitter of each of the transistors Q1 through Q5 is connected to the gate of a different one of the controlled rectifiers SCR2 through SCR6. The base of each of the transistors Q1 through Q5 is connected to the collector of a different one of a set of five NPN transistors Q6 through Q10. The emitter of each of the transistors Q6 through Q10 is grounded as shown.

The bases of the transistors Q6 through Q10 are each connected through a different one of a series of current distributing resistors R15 through R19 to the logic 1 output terminal of a flip flop F4. When the flip flop F4 is set in a manner to be described, a logic 1 signal potential labeled $\overline{ENABLE}$ is produced, causing each of the transistors Q6 through Q10 to be gated into conduction and thereby preventing any of the transistors Q1 through Q5 from being biased into conduction.

A trigger circuit is provided which extends from one terminal of the winding of the solenoid SK2 through a zener diode D3 to the base of a PNP transistor Q11. The emitter of the transistor Q11 is connected to the terminal 33b to receive a positive potential when the switch S12 is closed.

The collector of the transistor Q11 is returned to ground through a resistor R20. The collector of the transistor Q11 is also connected to a lead 235 through a pair of diodes D4 and D5 in series.

The lead 235 is connected to the base of the transistor Q1 through a resistor R21. The lead 235 is also connected to the emitters of a group of four PNP transistors Q12 through Q15, of which only the transistors Q12 and Q15 are shown. The collectors of the transistors Q12 through Q15 are connected to the bases of the transistors Q2 through Q5, respectively.

The base of the transistor Q12 is connected to the anode of the controlled rectifier SCR2 through a resistor R22. A similar resistor R23 connects the anode of the controlled rectifier SCR3 to the next stage transistor Q13, not shown. Other stages are similarly connected, e.g., the base of the transistor Q15 is connected to one terminal of a resistor R26, and the other terminal of the resistor R26 is connected to the anode of the controlled rectifier SCR5, not shown.

The flip flop F4 is arranged to be set when a PNP transistor Q16 is rendered conducting. The transistor Q16 has its emitter connected between the resistor R1 and the switch S12, and its base connected too the other terminal of the resistor R1. The transistor Q16 is accordingly forward biased when current flows through the resistor R1 as the switch S12 is closed.

The collector of the transistor Q16 is connected to the set input terminal of the fip flop F4. The collector of the transistor Q16 is also returned to ground through a resistor R27. When the transistor Q16 is first biased into conduction, the potential across the resistor R27 rises. When the current through the resistor R1 falls to a very low value in a manner that will appear, the falling transition across the resistor R27 triggers a one-shot multivibrator 236 to produce the pulse labeled FT that sets the flip flop F3 in FIG. 9 through the OR gate 207, as described above.

Operation of the circuit of FIG. 11 will next be described, on the assumptions that the parts are in the position shown, and that the signal $\overline{CLOSE}$ is present so that the switch S12 is closed. Under these conditions, the network comprising the resistors R2, R3 and R4, the capcitor C2, and the light-emitting diode D1 simulate the presence of an unfired flashlamp.

Since there are no connections to the other terminals 32a, none of the controlled rectifiers SCR3 through SCR6 will take part in the operation to be described. The capacitor C2 will be discharged, because its charging circuit is interrupted, with the controlled rectifier SCR2 and the transistor Q1 nonconducting. It will be further assumed that the flip flop F4 has been reset by the pulse SCP produced when the shutter is closed. Accordingly, the signal $\overline{ENABLE}$ is not present, and the transistors Q6 through Q10 are nonconducting.

Assume next that the solenoid SK2 is energized, and then deenergized. The negative TRIGGER spike will be produced, causing the diode D3 to break down and draw forward biasing current from the emitter to the base of the transistor Q11.

The potential across the resistor R20 will rise abruptly, causing a positive potential to appear on the lead 235. It should be noted here that the purpose of the diodes D4 and D4 is to drop the voltage on the lead 235 so that the emitters of the transistors Q12 through Q15 are below the potential at their bases with the controlled rectifier SCR2 nonconducting. This effect is not important to the operation of the strobe unit, but is useful in a way that will be explained below in connection with the operation of the apparatus with flashlamps.

The pulse of increased potential across on the lead 235 will bias the transistor Q1 into conduction, causing the potential across the resistor R10 to rise, and supplying gate current to turn on the controlled rectifier SCR2, which will then go into avalanche conduction. Current will now flow through the resistor R3, charging the capacitor C2, and will also flow through the branch comprising the resistor R4 and the light-emitting diode D1.

The light-emitting diode D1 will emit a light flash to cause the light-responsive diode D2 to go into conduction, gating the controlled rectifier SCR1 into conduction. Assuming that the capacitors C3 and C4 are charged, with the rectifier SCR1 conducting, the capacitor C4 will discharge, causing the pulse transformer 232 to gate the gas tube 36 into conduction to produce a light flash.

The capacitor C2 will charge rapidly, cutting off current flow to the controlled rectifier SCR2, to a small threshhold value that is established by the current flowing through the relatively large resistor R2. The current through the resistor R1 will drop rather abruptly, causing the multivibrator 236 to be triggered to produce its pulse FT.

When the controlled rectifier SCR2 is first gated into conduction, the rapid current flow through it, charging the capacitor C2 through the small resistor R3, will cause the current through the resistor R1 to rise, gating the transistor Q16 into conduction and setting the flip flop F4. The flip flop F4 then produces the signal labeled $\overline{ENABLE}$, gating all the transistors Q6 through Q10 into conduction and thereby preventing the subsequent gating of any of the other controlled rectifiers SCR3 through SCR6 into conduction. This operation is used to prevent multiple flashing of flashlamps, but is not necessary with the strobe unit 2 because the other controlled rectifiers have no connection to their anodes.

Following the charging of the capacitor C2, the capacitor C2 will discharge through the resistor R2. The controlled rectifier SCR2 will continue to conduct a small current passing through the resistor R2 until the switch S12 is opened when the level $\overline{CLOSE}$ is removed as the shutter is closed. The circuit will then be returned to its initial condition.

Assume next that the flash array 215 was connected to the camera circuit, instead of the strobe unit 2. Following the discharge of the firstlamp 218 to the left, which would occur in the manner described above, there would be an open circuit between the first terminal 32a and the terminal 32b, because the flashlamp would be burned out. Under those conditions, should a TRIGGER pulse be applied, when the transistor Q11 is biased into conduction, the transistor Q1 will be forward biased, drawing collector current through the base of the transistor Q12, and through the now forward biased emitter of the transistor Q12, and the controlled rectifier SCR2 will be gated into conduction. Note that the anode of the controlled rectifier SCR2 will now be below the potential of the emitter of the transistor Q12, rather than above it, as before the first flashlamp was fired.

With the second flashlamp initially in place, the anode of the controlled rectifier SCR3 will be initially near B+, so that the next stage transistor Q13, now shown, cannot be gated into conduction. Accordingly, however, the controlled rectifier SCR3 will be gated into conduction by conduction through the transistor Q12 biasing the transistor Q2 into conduction, providing gating current for the controlled rectifier SCR3. That will cause firing of only the second flashlamp.

Having thus described the construction of the illustrated embodiment of the invention, its operation will next be described with reference to FIGS. 1 through 9 and 11. First, referring to FIGS. 1 and 2, assume that the housing 18 is open, as shown in FIG. 2, and that a cassette 3 is next inserted into the position shown in FIG. 1.

When the housing 18 is closed, the switch S1 in FIGS. 3 and 9 will be closed. Referring to FIG. 9, that will cause the potential B+ to be produced, and trigger the multivibrator 193 to produce the CLEAR pulse.

The CLEAR pulse will reset the flip flops F1 and F2, and set the flip flop F3, through the OR gates 194, 208 and 207, respectively. Assuming that the camera is in the erected position shown in FIG. 1, with the mirror 67 down as shown, the switch S2 will be closed as shown in FIG. 9.

With the flip flop F2 reset, the level $\overline{\text{CLOSE}}$ will be applied to close the switch S12 in FIG. 11, supplying operating potential to the terminal 32b. Assuming that the strobe unit 2 is in position, the anode of the controlled rectifier SCR2 will assume the potential B+. Assuming that the switch 35 is closed, the strobe unit 2 will begin to charge the capacitors C3 and C4.

Meanwhile, referring to FIG. 9, the trailing edge of the CLEAR pulse will trigger the multivibrator 191 to produce the START pulse that sets the flip flop F1 through the OR gate 190. That will cause the signal RUN to be produced, closing the switch S7 and causing the motor 82 to begin to run to drive the timing belt 107.

Referring to FIGS. 1 and 2, with the mirror 67 down, the follower 120 will be out of the way, and the cam 121 will pass it without engagement. The switch S3 will be open.

The cam 121 will next encounter the arm 122 that is connected to the picker finger 98 as shown in FIG. 3. The picker finger will then engage the corner of the dark slide 99 that covers the first film unit 72, and move the dark slide out into engagement with the processing rolls 56 and 57, which are rotating at this time. The dark slide will next be driven against the plate 53 and down and out through the exit slot 65.

The motor will continue to operate until the cam 121 reaches the position in which it momentarily closes the switch S4, shown in FIGS. 2 and 9, to trigger the one-shot multivibrator 195 to produce the pulse labeled END. The END pulse now resets the flip flop F1 through the OR gate 194, causing the level RUN to disappear and open the switch S7 to stop the motor 82. The parts will coast to a stop with the cam 121 somewhere in the vicinity shown in FIG. 2.

The apparatus is now in condition for making a flash exposure. Referring to FIG. 11, it will be assumed that the capacitor C4 is fully charged, and that the READY light 34 is glowing to indicate the readiness of the strobe unit to be fixed. Next, assume that the shuttter pushbutton 49 is depressed to close the switch SPB in FIG. 9, triggering the one-shot multivibrator 203. The pulse produced by the multivibrator 203 will set the flip flop F2 through the OR gate 202. The signal CLOSE will be produced, closing the switch S8 and supplying current to the shutter operating solenoid SK1.

Referring to FIGS. 4 and 5, energizing the solenoid SK1 will cause the shutter blades 47 and 48 to be moved from the position shown in FIG. 4 to the position shown in FIG. 5, covering the opening in the lens 46. The photocell aperture 173 will also be closed at this time.

Referring to FIG. 9, with the flip flop F3 set, the level $\overline{\text{TIME}}$ will be produced to close the switch S9, shunting the capacitor C1. When the shutter is closed, the switch S5 will be closed to trigger the one-shot multivibrator 196 to produce the pulse SCP. The pulse SCP, applied to the gate 210, will cause the switch S10 to the closed. The gate 210 is enabled at this time by the presence of the signal MDS produced by the NOR gate 209. The pulse SCP will also reset the flip flop F4 in FIG. 11, causing the level $\overline{\text{ENABLE}}$ to be removed, if it is present, and causing the transistors Q6 through Q10 to become nonconducting.

With the switch S10 closed, the solenoid SK3 will be energized, the mirror latch 84 will be released, and the mirror 67 will fly up under the influence of the spring 83. When the mirror reaches its upper position, the switch S3 will be closed. That will cause the multivibrator 199 to be triggered, producing its output pulse and will cause the gate 197 to produce the level MUS. Since the pulse SCP has disappeared by this time, the gate 192 will not produce a logic 1 output signal.

At the end of the pulse produced by the multivibrator 199, the multivibrator 200 will be triggered to produce the pulse EMD. The leading edge of this pulse will produce the timed pulse OT by triggering the multivibrator 201. That will cause the switch S11 to be closed.

Assuming that the switch, schematically shown in FIG. 9 as S6, and comprising the bridged terminals 33c of the camera, shown in FIG. 11, is closed, the solenoid SK2 will be energized. Referring to FIG. 7, that will cause the interceptor pin 155 to be raised into the path of the walking beam 158, shown also in FIG. 5.

The pulse EMD will reset the flip flop F2 through the gate 208, causing the signal $\overline{\text{CLOSE}}$ to be produced and the level CLOSE to be removed. Removing the level CLOSE will open the switch S8, deenergizing the solenoid SK1 and allowing the shutter blades to move towards their open position.

The pulse EMD will also reset the flip flop F3 to remove the level $\overline{\text{TIME}}$ and open the switch S9. The capacitor C1 will accordingly begin to charge through the photocell 206.

If a flash or strobe unit is not inserted in the camera, so that the switch S6 is open, the capacitor C1 will charge for a time dependent on the light sensed by the photocell 206 to actuate the Schmitt trigger 205 when the film unit has been properly exposed. That will trigger the multivibrator 204 to produce the pulse EE, setting the flip flop F2 to close the shutter and setting the flip flop F3 to discharge the capacitor C1 by closing the switch S9. With the flash or strobe unit in place, the shutter will be closed by the signal FT, in a manner to be described, normally before the capacitor C1 has charged to the level at which the Schmitt trigger 205 responds.

Referring to FIG. 11 the level $\overline{\text{CLOSE}}$ will close the switch S12. The strobe firing circuit is now enabled.

Referring to FIG. 8, at some position determined by the focused position of the lens, the walking beam 158 will strike the interceptor pin 155 and stop the blades at a predetermined maximum aperture. This interception will occur at some time during the interval established by the pulse OT from the multivibrator 201 in FIG. 9, as the latter is long enough to allow the blades to reach full aperture if that is required.

At the end of the pulse OT, the switch S11 will be opened and the solenoid SK2 will be released. Referring to FIG. 7, even though the solenoid SK2 is deenergized, the interceptor pin 155 will remain in the dotted-line position shown under the force of the walking beam 158.

Referring to FIG. 11, when the solenoid SK2 is deenergized, the negative TRIGGER spike will be produced to briefly gate the transistor Q11 into conduction and thereby bias the transistor Q1 into conduction, providing gate current for the controlled rectifier SCR2 to allow the charging of the capacitor C2, and causing the diode D1 to emit a light flash that will excite the diode D1 into conduction. That will gate the controlled rectifier SCR1 into conduction, abruptly discharging the capacitor C4 and triggering the tube 36 to allow the capacitor C3 to discharge through it and produce a flash of light.

Following the brief surge of current through the resistor R1 during which the capacitor C2 is charged, and the transistor Q16 is gated into conduction to set the flip flop F4, current through the resistor R1 will fall to a very low value established by the resistor R2. This falling transition will trigger the multivibrator 236 to produce the pulse FT.

Referring to FIG. 9, the pulse FT will set the flip flop F3 through the gate 207 to produce the $\overline{\text{TIME}}$ signal that will close the switch S9 and discharge the capacitor C1. At the same time, the pulse FT will set the flip flop F2 through the OR gate 202 to produce the signal labeled CLOSE.

The CLOSE signal will close the switch S8 to cause the solenoid SK1 to be energized and close the shutter. When the shutter is closed, the switch S5 in FIG. 9 will be closed to trigger the multivibrator 196 to produce the pulse SCP.

In the presence of the level MUS from the gate 197, produced with the "mirror up" switch S3 closed, the pulse SCP will cause the AND gate 192 to produce a logic 1 output pulse that will set the flip flop F1 through the OR gate 190. The level RUN will now be produced to close the switch S7 and cause the motor 82 to run.

The cam 121 on the timing belt 107 will now engage the end 120 of the arm 119, as shown in FIG. 2 and more schematically in FIG. 9, and the mirror 67 will be driven down against the force of the spring 83. As the mirror moves down into its lower position, it will move back the latch 84 and become latched, closing the switch S2.

When the switch S2 closes, the multivibrator 208 will be triggered to produce the pulse MD. This pulse will set the flip flop F2 through the gate 208. The switch S8 will then be opened to deenergize the solenoid SK1 and allow the shutter to open.

The cam 121 will move free of the arm 120, and over into engagement with the picker finger operating arm 122, causing the uppermost film unit 72 just exposed in the manner described above to be advanced to the processing rolls 56 and 57, which are rotating at this time. The film unit will be driven through the processing rolls and out through the exit slot 65, for delivery to the photographer.

The belt 107 will continue to be driven until the cam 121 again momentarily closes the switch S4, causing the signal END to be produced by the multivibrator 195 in FIG. 9. The END signal will reset the flip flop F1 through the OR gate 194, causing the motor 82 to stop.

The apparatus will now be in a standby condition, with the strobe unit 2 in FIG. 2 operating to charge the capacitors C3 and C4 until the READY light 34 again glows to indicate that the apparatus is ready for another exposure. Operation of the camera to take a series of pictures may continue in the manner just described above for a typical illustrative exposure. When the last film unit has been exposed and ejected, the camera housing 18 can be opened to allow the the removal of the cassette body, in readiness for replacement by a new cassette.

To recapitulate the above description of the solenoid SK2 and its functions, the solenoid SK2 operates the interceptor pin 155 as indicated in FIGS. 4, 5, 6, and 7. When the winding 179 of the solenoid SK2 is energized, (FIG. 7), the interceptor pin 155 is drawn up into the path of the bight 182 in the walking beam 158 so that the blades 47 and 48 are stopped by the interceptor pin at an aperture selected by the location of the interceptor 155. This location is determined by the focused position of the lens, causing the interceptor location 155 to be rotated in FIG. 4 in dependence on the focused position of the lens.

As described above, the solenoid SK2 is energized when the solenoid SK1 is de-energized to cause the above-described operation to take place. Referring to FIG. 9, when the solenoid SK1 is de-energized, the shutter is allowed to open (compare FIG. 8). Referring again to FIG. 9, it is seen that the solenoid SK2 is connected in the circuit that extends over the contacts of the switch S6 and over the load terminals of the electronic switch S11 to B+. Comparing FIG. 11, S6 is the switch closed by the shorting bar 32c on the strobe unit 2, this switch being closed at all times when the strobe unit is on the camera.

Referring again to FIG. 9, assuming that the strobe unit is in position and the switch S6 is closed, the solenoid SK2 will be operated each time the switch S11 is closed. As described above, the switch S11 is closed when a pulse OT is produced by the multivibrator 201. This pulse is produced at the leading edge of the mirror delay pulse EMD produced by the multivibrator 200 in FIG. 9.

Referring to FIG. 9, the pulse EMD resets the flip flop F2 through the OR gate 208 to produce the logic 1 level $\overline{\text{CLOSE}}$. The switch S8 is opened by this action, de-energizing the solenoid SK1. At the same time, the pulse OT produced by the multivibrator 201 closes the switch S11 to energize the solenoid SK2.

As noted above, the duration of the pulse OT is sufficient to allow operation of the solenoid SK2 to place the interceptor pin as described above in position and hold it there until the blades 47 and 48 have had time to move to the FIG. 4 position in which the lens is open to the aperture selected by the position of the interceptor pin.

Referring to FIG. 9, the operation of the circuit will be traced from the depression of the shutter pushbutton SPB. When that occurs, the one-shot multivibrator 203 is triggered to set the flip flop F2 through the OR gate 202. Setting the flip flop F2 produces the CLOSE level that closes the switch S8, energizing the shutter solenoid SK1 to close the shutter. When the shutter is closed, the switch S5 is closed to produce the shutter pulse SCP by triggering the multivibrator 196.

The pulse SCP is applied to AND gate 210, in the presence of the signal MDS produced by the NOR gate 209 with the mirror in its down position closing the switch S2. The gate 210 will now close the switch S10 to energize the solenoid SK3 and unlatch the mirror, permitting it to fly up to its taking position and close the switch S3.

Closing the switch S3 triggers the multivibrator 199 to produce a delaying pulse, allowing the mirror to settle down. At the trailing end of this pulse, the multivibrator 200 is triggered to produce the pulse EMD as described above. This pulse causes the shutter to open by resetting the flip flop F2 through the gate 208, and triggers the multivibrator 201 to produce the pulse OT that closes the switch 11 to energize the solenoid SK2 as described above.

In brief summary, when the shutter pushbutton is actuated and the strobe unit is present, (1) the shutter is closed, (2) the mirror is released, (3) a delay ensues to allow the mirror to reach a stable position, and then (4) the interceptor solenoid SK2 is energized as the shutter solenoid is de-energized to allow the shutter blades to begin to open.

While the invention has been described with respect to the details of a particular embodiment, many changes and variations will occur to those skilled in the art upon reading this description. Such can obviously be made without departing from the scope of the invention.

Having thus described the invention, what is claimed is:

1. An electronic flash unit for use with a camera having an accessory connector adapted to receive at least one flashlamp and having terminals adapted to be supplied with current for firing a flashlamp, said electronic flash unit comprising a triggerable gas discharge tube, means for supplying electrical energy to said tube to cause said tube to produce a flash of light when triggered, trigger circuit means connected to said tube and responsive to an applied signal to trigger said tube, and a signal generating impedance network having input terminals adapted to be connected to the current supply terminals of the camera, said network comprising a resistance approximating the resistance of an unfired flashlamp connected in series with a capacitor between said input terminals, whereby current supplied to said input terminals flows in a pulse that falls in amplitude as said capacitor is charged, simulating the impedance characteristics of a flashlamp as it is fired, said impedance network further comprising means responsive to the flow of current through said capacitor to apply a signal to said trigger circuit means.

2. A photoelectrical trigger and flashlamp simulating circuit for an electronic flash unit, comprising a pair of input terminals adapted to be connected to a DC source, a capacitor and a first resistor having a resistance approximating the resistance of an unfired flashlamp connected in series between said terminals, a light-emitting diode and a second resistor connected in series across said first resistor, and a third resistor having a resistance high enough to simulate an open circuit connected across said capacitor.

3. An electronic flash unit for a camera having a pair of output terminals adapted to supply current to fire a flashlamp and provided with means responsive to impedance changes across the output terminals to control the cycle of operation of the camera, said flash unit comprising first and second input terminals adapted to be connected to the output terminals of the camera, triggerable light source means responsive to an applied trigger signal for producing a flash of light, and a flashlamp simulating and trigger signal producing network connected between said input terminals, said network having an impedance that increases from a value simualting an unfired flashlamp to a value simulating a fired flashlamp in response to direct current applied to said input terminals, and said network further comprising means responsive to the flow of current for producing a trigger signal and applying said trigger signal to said light source means.

4. An electronic flash unit, comprising a housing, a reflector mounted in said housing, a gas discharge tube mounted in said reflector, photoelectric circuit means responsive to a light signal to energize said discharge tube to produce a flash of light, an electrical connector on said housing having a pair of terminals adapted to be energized with direct current, a resistor and a capacitor connected in series with said terminals, and light signal generating means in optical communication with said photoelectric circuit means connected in parallel with said resistor and responsive to applied current to apply a light signal to said photoelectric circit means.

5. An electronic flash unit adapted for use with a camera having output terminals, means for applying a direct voltage to the output terminals, and means for sensing a drop in current across the output terminals to terminate an exposure cycle, said flash unit comprising first and second terminals adapted to be connected to the output terminals of the camera, a third terminal, a first resistor connected between said first and third terminals, a capacitor connected between said third terminal and said second terminal, a second resistor and a light-emitting diode connected in series between said first terminal and said third terminal, a third resistor connected between said third terminal and said second terminal, said first and second resistors having resistances selected to make the resistance between said first and third terminals approximately the resistance of an unfired flashlamp, said third resistor having a resistance high enough to simulate an open circuit to the camera, an electronic flash circuit responsive to an applied trigger signal to produce a flash of illuminating light, and a light responsive signal generator confronting said light-emitting diode and responsive to light emitted by said diode in response to a surge of current between said first and third terminals for applying a trigger signal to said flash circuit.

6. The apparatus of claim 5 in which said electronic flash circuit comprises a second capacitor, a gas tube having a pair of electrodes connected across said second capacitor and a trigger electrode, means for charging said second capacitor, means responsive to a predetermined voltage across said capacitor for producing a supply voltage, and trigger pulse generating means comprising an electronic switch and circuit means responsive to the closing of said switch for applying a trigger pulse to said trigger electrode to discharge said second capacitor through said gas tube and produce a flash of light, and in which said light-responsive signal generator comprises a light-responsive diode arranged to be illuminated by said light-emitting diode and means for applying said supply voltage to said electronic switch through said light-responsive diode to close said electronic switch when said supply voltage is present and said light-responsive diode is illuminated by a flash from said light-emitting diode.

7. In an electronic flash unit, a triggerable discharge tube, photoelectric triggering means responsive to a flash of light for triggering said tube, and a flashlamp simulating and light flash generating circuit for coupling said photoelectric triggering means to a camera adapted for use with flashlamps and having output terminals adapted to be supplied with DC voltage when a flashlamp is to be fired, said circuit comprising input terminals adapted to be connected to the output terminals of the camera, and an impedance network connected between said input terminals, said impedance network having an impedance that rises from an initial value simulating the impedance of an unfired flashlamp to a higher value simulating the impedance of a fired flashlamp, whereby a pulse of current flows through said network in response to a DC voltage applied to said input terminals, said impedance network comprising a light-emitting diode optically coupled to said photoelectric triggering means for transmitting a flash of light to said triggering means in response to the flow of current through said network.

8. In combination with an electronic flash circuit of the type including a ready lamp which conducts when the flash circuit is charged in readiness to be triggered and a triggering circuit having first and second terminals and responsive to current applied to said terminals for triggering the flash circuit to produce a brilliant flash of light, a photoelectric circuit for supplying current to said terminals when and only when said ready light is conducting and a low level light flash is emitted, said photoelectric circuit comprising a resistor connected in series with said ready light, whereby current flows through said resistor when said ready light is conducting, and a light-responsive diode connected in a series path with said terminals and said resistor, whereby current is applied to said terminals when and only when said light-responsive diode is illuminated and said ready light is conducting.

9. An electronic flash unit, comprising first and second input terminals adapted to be energized with a DC voltage when an illuminating flash is to be produced, a third terminal, a resistor having a resistance approximating the impedance of an unfired flashlamp connected between said first terminal and said third terminal, a capacitor connected between said second terminal and said third terminal, a light-emitting diode, means connecting said light-emitting diode between said first terminal and said third terminal to produce a flash of light upon the application of a DC voltage to said first and second terminals, a flash circuit comprising a triggerable gas discharge tube, means for supplying energy to said discharge tube to cause said tube to emit an illuminating flash of light when triggered, and circuit means comprising a light-responsive switch confronting said light-emitting diode for triggering said flash circuit when a flash of light is emitted by said light-emitting diode.

10. An accessory electronic flash unit for a camera adapted for use with flashlamps and having a pair of output terminals to which a DC voltage is applied when a flashlamp is to be fired and means responsive to the impedance increase across the output terminals when a flashlamp is fired for initiating the termination of an exposure cycle, said flash unit comprising rechargeable flash circuit means having first and second input terminals, said flash circuit means comprising means for producing a voltage across said input terminals when said flash circuit means is charged, light-responsive switching means connected between said first and second input terminals and responsive to an applied light flash to allow the flow of current between said first and second terminals when said voltage is present, and means responsive to the flow of current between said terminals for producing an illuminating flash of light, and coupling circuit, said coupling circuit comprising third and fourth input terminals adapted to be connected to the output terminals of the camera to receive a DC voltage when an illuminating flash is required, a resistor and a capacitor connected in series with said third and fourth terminls to simulate a flashlamp by drawing a pulse of current when a DC voltage is applied to said third and fourth terminals, and light-emitting impedance means confronting said light-responsive switch and connected in parallel with said resistor to produce a flash of light when a pulse of current flows between said third and fourth terminals and thereby apply a light flash to said light-responsive switch.

11. Apparatus for use with a camera having an accessory connector adapted to receive at least one flashlamp and having terminals adapted to be supplied with current for firing a flashlamp, said apparatus comprising means for mounting a triggerable gas discharge tube, means for supplying electrical energy to the tube to cause the tube to produce a flash of light when triggered, trigger circuit means adapted to be connected to the tube and responsive to an applied signal to trigger the tube, and a signal generating impedance network having input terminals adapted to be connected to the current supply terminals of the camera, said network comprising a resistance approximating the resistance of an unfired flashlamp connected in series with a capacitor between said input terminals, whereby current supplied to said input terminals flows in a pulse that falls in amplitude as said capacitor is charged, simulating the impedance characteristics of a flashlamp as it is fired, said impedance network further comprising means responsive to the flow of current through said capacitor to apply a signal to said trigger circuit means.

12. A photoelectrical trigger and flashlamp simulating circuit for optically triggering an electronic flash unit having a photoresponsive trigger circuit in responsive to a voltage appearing on a pair of flash firing terminals on a camera, comprising a pair of input terminals adapted to be connected to the flash firing terminals of the camera, a capacitor and a first resistor having a resistance approximating the resistance of a unfired flashlamp connected in series between said terminals, whereby an impedance simulating that of a flashlamp being fired is presented across said input terminals when a voltage is applied to said input terminals with said capacitor initially discharged, a light-emitting diode and a second resistor connected in series across said first resistor, whereby an optical triggering light flash is produced by said light-emitting diode when a voltage is applied to said input terminals, and a third resistor having a resistance high enough to simulate an open circuit connected across said capacitor whereby said capacitor is discharged when it has been charged by a voltage applied to said input terminals and the voltage is subsequently removed.

13. Apparatus for triggering an electronic flash unit having a main flash lamp and a trigger circuit including a photosensitive device responsive to a flash of light to trigger the main flash lamp, comprising an impedance network whose impedance varies from low to high in response to an applied voltage to simulate the impedance of a flash lamp before and during firing, said impedance network comprising a light-emitting element for applying a flash of light to the photosensitive device in response to the application of a voltage to said network.

14. The apparatus of claim 13 in which said impedance network is connected between a pair of terminals adapted to be connected to flash firing terminals of a camera across which a voltage suitable for firing a flashlamp is applied when an illuminating flash is required, said network comprising a first resistor having a resistance approximating the resistance of an unfired flashlamp and a capacitor connected in series between said terminals, means connecting said light-emitting element in parallel with said first resistor, and a second resistor having a resistance simulating the impedance of a fired flashlamp connected in parallel with said capacitor to discharge said capacitor in the absence of a voltage applied to said terminals.

* * * * *